United States Patent [19]

Gallagher et al.

[11] 3,862,740

[45] Jan. 28, 1975

[54] BUTTERFLY VALVE

[75] Inventors: Bernard J. Gallagher; Earl D. Shufflebarger, both of Mentor; David M. Simko, Parma Heights; Frank M. Cunningham, Euclid; Oliver L. Danko, Chesterland, all of Ohio

[73] Assignee: Nupro Company, Cleveland, Ohio

[22] Filed: July 5, 1973

[21] Appl. No.: 376,684

[52] U.S. Cl. .................................. 251/305, 251/173
[51] Int. Cl. .............................................. F16k 1/22
[58] Field of Search .......... 251/304, 305, 306, 307, 251/308, 314, 315, 298, 173

[56] References Cited
UNITED STATES PATENTS

| | | | |
|---|---|---|---|
| 2,913,218 | 11/1959 | Broz | 251/173 |
| 2,974,921 | 3/1961 | Kaswan | 251/173 X |
| 3,078,069 | 2/1963 | Broadbent | 251/305 X |
| 3,096,071 | 7/1963 | Fisher | 251/306 |
| 3,423,066 | 1/1969 | Henrion | 251/308 |
| 3,675,677 | 7/1972 | Scaramucci | 251/306 X |

Primary Examiner—Charles J. Myhre
Assistant Examiner—Ira S. Lazarus
Attorney, Agent, or Firm—Fay & Sharpe

[57] ABSTRACT

The specification and drawings disclose a butterfly valve arranged to have high conductance and low out gassing when used in a vacuum system. The valve is designed to have a small overall size for its diameter and to have a minimum amount of nonmetallic material.

9 Claims, 6 Drawing Figures

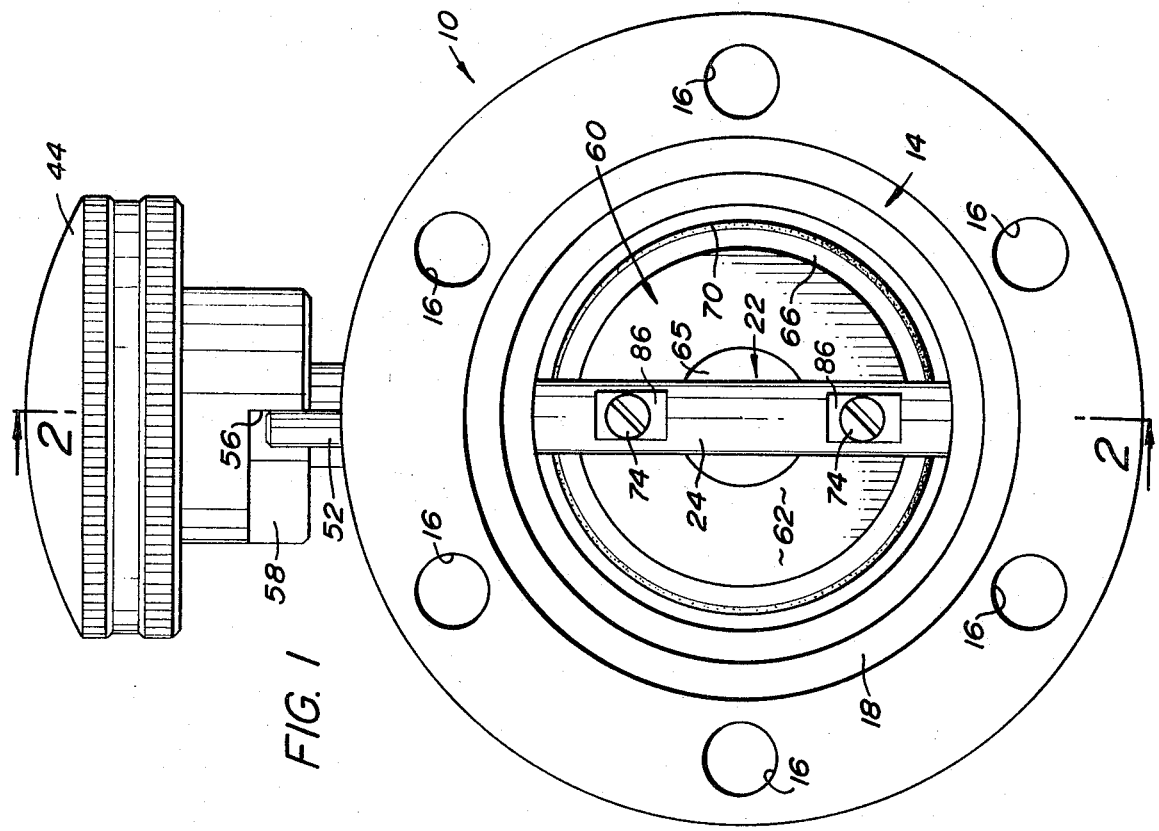
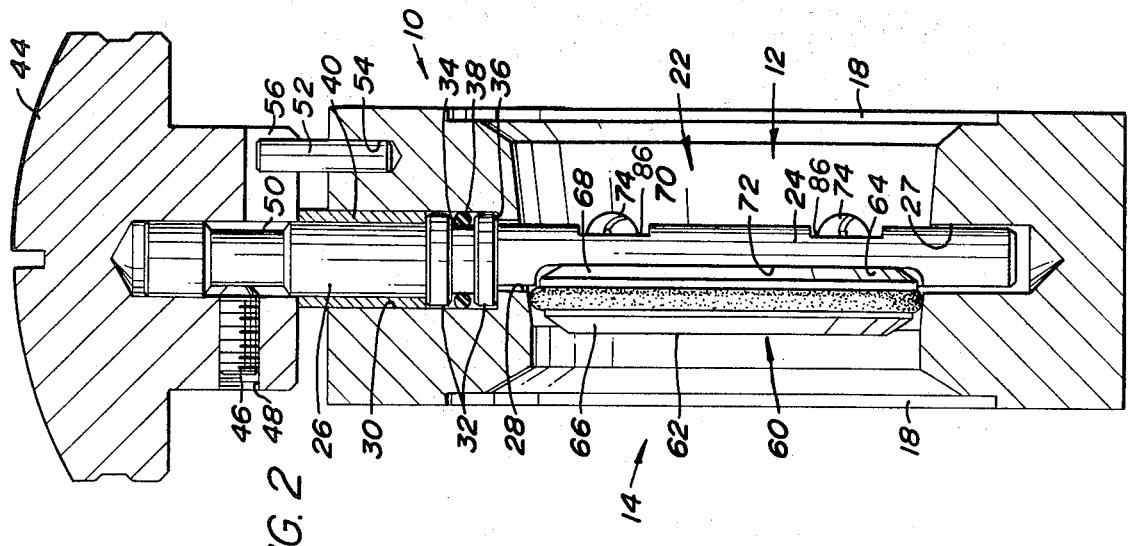

PATENTED JAN 28 1975 3,862,740

BUTTERFLY VALVE

The subject invention is directed toward the valve art and, more particularly, to an improved butterfly valve.

Valves formed in accordance with the invention are especially suited for use in vacuum systems and will be described with particular reference thereto; however, as will become apparent, the invention can be embodied in valves for many different systems.

Butterfly valves are often used in vacuum systems because of their comparatively high conductance, rapid actuation, and general simplicity. Since vacuum system connecting flanges and the like are comparatively well standardized, valves for use in the systems must be designed within certain narrow ranges of diameters, lengths, flange bolt spacings and the like. Because of these fixed parameters, it has been difficult to reduce the overall size or increase the conductance of the valves.

An additional disadvantage present in many prior art valves has been their tendancy to have "out gassing" and "virtual leak" problems. To explain, when the internal components of the valves are placed under a high vacuum, the resilient rubber or polymeric seals give off molecules of the solvents and the like used in compounding them. This is often referred to as out gassing and can cause problems in vacuum systems. A virtual leak is a somewhat similar problem which results from air or other gas being trapped between mating parts or in internal cavities in the valves during manufacture or use and then slowly leaking into the system when the valve is placed under a vacuum.

The present invention provides a butterfly valve which eliminates or minimizes the above problems and, when compared with prior valves, gives a substantially increased conductance even though designed within the same fixed parameters.

Accordingly, one object of the invention is the provision of a butterfly valve wherein the through-flow passage and valve member are arranged to substantially increase the conductivity of the valve over prior art valves of the same size rating. The invention contemplates that the through-flow passage will include a tapered portion in which the valve member is rotatably mounted. The location of the valve member is such that in the closed position, its periphery engages the small diameter end of the tapered portion. In the open position, it extends outwardly of the longitudinal limits of the passage a slight amount. The disk member preferably is formed from a rigid metal disk having a relatively small, resilient periphery which mates with the tapered portion of the through passage closely adjacent its small diameter end. Because of the arrangement and location of the disk, only a small amount of nonmetallic material is required in the periphery. This results in a lessening of out gassing problems.

In addition to the lessening of out gassing problems, the disk and its operating stem are interconnected and supported in a manner which reduces problems with virtual leaks. In particular, the disk is preferably connected to the operating stem by screws which are slotted their entire length. The stem passes outwardly through a radially extending bore in the body. A shoulder at the inner end of the bore engages a first flange on the stem to support the stem and disk. Radially outwardly of the first flange is a stem seal and a second flange. A stem guide bushing is press fitted to bear against the second flange. The stem seal is located between the through passage and the bushing so that there can be no virtual leaks from the bushing into the passage.

An additional and important aspect of the invention resides in the manner in which the conductance through the valve is maximized by the design of the through-flow passage and its relationship to the valve disk.

The above and other objects and advantages will become apparent from the following description when read in conjunction with the accompanying drawings wherein:

FIG. 1 is an end view looking into the through passage of a butterfly valve formed in accordance with a preferred embodiment of the invention;

FIG. 2 is a cross-sectional view taken on line 2—2 of FIG. 1;

Figure 6:
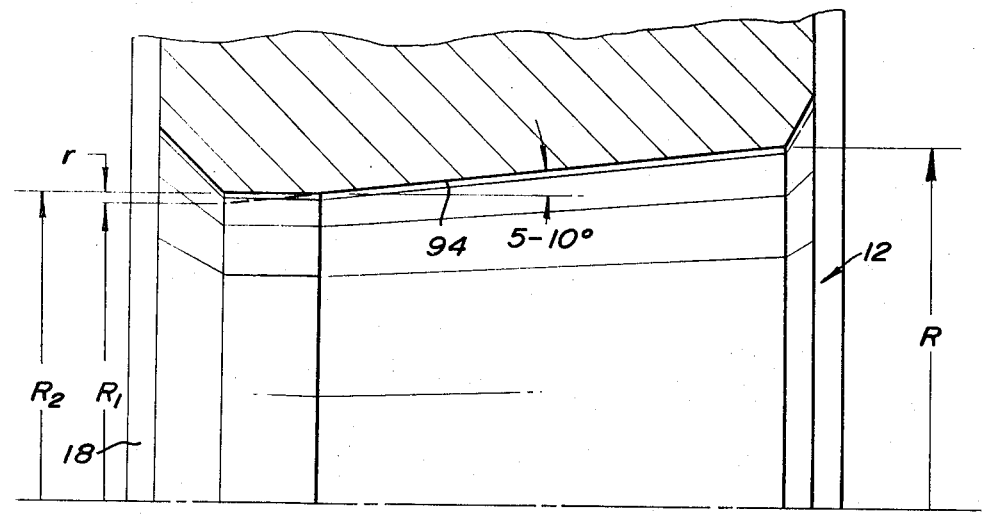

Referring in particular to FIGS. 1 and 2, the valve is shown as comprising a body or housing 10 having a through passage 12 in which is mounted a valve disk and actuating assembly 14.

The housing 10 could take many forms, but in the preferred embodiment comprises a single, cylindrical segment of stainless steel. The outer diameter of the housing is sized so as to correspond, in general, to the standard flange diameter for conventionally used vacuum lines. Further, a series of flange bolt openings 16 are formed parallel to the body axis and extend longitudinally through the body at a diameter corresponding to the diameter of the flange bolt holes.

The details of through passage 12 will subsequently be described in substantial detail; however, for the present, it should be noted that it is a stepped diameter opening which is bored or formed axially through the housing 10. Positioned about the inlet and outlet end of the passage are recesses 18 which are sized to receive soft metal gaskets that are positioned between the valve body and the mating flanges. Customarily, the recesses include one or more outwardly extending projections (not shown) which enter the gasket upon tightening of the flanges and assure a vacuum-tight seal between the valve body and the flanges. This general type of joint is described, for example, in U.S. Pat. No. 3,208,758.

Extending into the valve body 10 substantially perpendicular to its axis is the valve disk and actuating stem assembly 14. Assembly 14 includes the actuating stem 22 which is preferably of single piece, stainless steel construction having a somewhat reduced diameter lower end portion 24 and a relatively large upper end portion 26. The lower end of portion 22 is freely received within a bore 27 formed radially outwardly from the flow passage 14 and only partway through the body. The upper end portion 22 is freely received in a diametrically aligned opening 28. A counterbored section 30 extends inwardly from the exterior of the body into alignment with opening 28.

Figure 3:
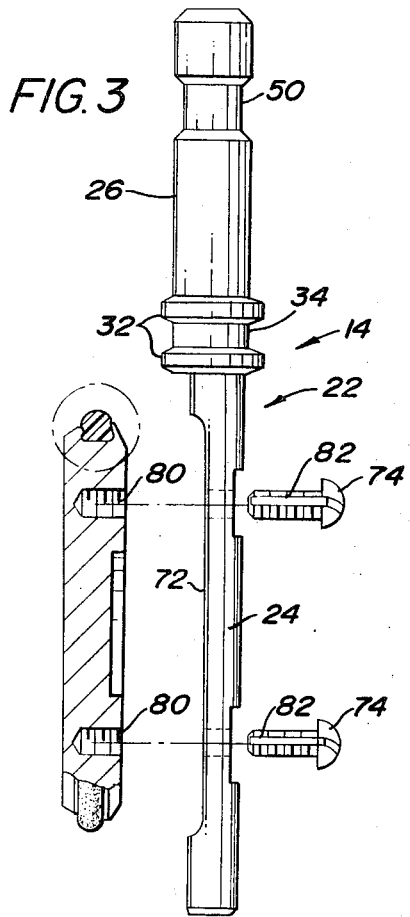
FIG. 3 is an exploded view, partially in section, of the valve disk and actuating stem assembly of the valve of FIG. 1.

The enlarged diameter upper end 26 of the stem 22 is received within the counterbore 30 and, as best shown in FIGS. 2 and 3, a pair of spaced flanges 32 are formed about the lower portion of section 26 and define a seal or O-ring receiving groove 34. The under face of the lower flange 32 rests on the shoulder 36 formed at the juncture between the counterbore 30 and the passage 28. This acts to position the stem in directions radially of the passage. As seen in FIG. 2, the outer circumference of the flanges 32 are sized so as to be spaced a slight amount from the inner wall of the counterbore 30. A resilient, elastomeric O-ring or the like 38 is positioned within the groove 34 and provides a fluid seal about the stem.

As previously mentioned, the stem portion 22 is relatively loosely received in the openings or passages 27, 28. For this reason, the primary guiding of the stem is accomplished by a removable guide sleeve or bushing 40 which is snugly received within the bore 30 and engages the outer surface of the stem section 26. This is particularly advantageous, especially in vacuum valves, because the stem guiding surface is located at a point outwardly of the fluid seal. In this manner, the stem guiding surface is eliminating a potential source of virtual leaks since the bushing is isolated from the system by the stem seal.

As can be appreciated the stem could be rotated to operate the valve disk by many types of actuators either automatic or manual. In opening subject embodiment, a simple hand knob 44 is releasably connected to the upper end of section 26 of the operating stem. It will be noted that a set screw 46 passes through a threaded opening 48 into engagement with a reduced diameter 50 machined on the end of the stem. A second set screw (not shown) extends inwardly at a location spaced 90° from screw 48. Preferably, the movement of the knob 44 is limited at the full open and full closed positions of the valve disk by a hardened stop pin 52 press fitted into an 90° 54 formed in the body 10. The upper end of the pin 52 is positioned to engage flats or surfaces 56, 58 formed in the lower section of knob 44. The flats 56, 58 are positioned at a 90° angle relative to one another to define the limits of movement of the knob corresponding to the full open and full closed positions of the valve disk.

As best shown in FIGS. 2 and 3, the valve disk 60 is releasably carried on the lower end section 24 of the stem 22. The disk could take many different forms but is shown as a solid circular section or piece of stainless steel having opposed flat faces 62, 64 with tapered peripheral edges 66, 68, respectively. A resilient seal 70 extends circumferentially about the periphery of the disk to provide a fluid tight seal when the disk is positioned at right angles to the axis of the passageway 14 in a manner to be described. The face 64 includes a circular recess 65 formed at the location shown.

The disk 60 is, as previously mentioned, releasably connected to the lower end of shaft 22. In the subject embodiment, a flat 72 is machined on one side of section 24 of stem 22. Machined screws 74 extend through openings 76 formed diametrically through the stem into tapped openings 80 formed in the valve disk 60. In order that any air trapped between the screws and the tapped openings can be readily withdrawn during pump down, slots 82 extend longitudinally of the screws. As can be appreciated, with the screws in position, the slots will allow ready escape of any air within the connection thus eliminating the possibility of virtual leaks when the valve is used in a vacuum system. The presence of recess 65 further reduces the possibility of virtual leaks from between the stem and the disk.

Additionally, it should be noted that the stem section 24 is provided with flats 86 of a diameter slightly larger than the diameter of the heads of the screws 74.

Figure 4:
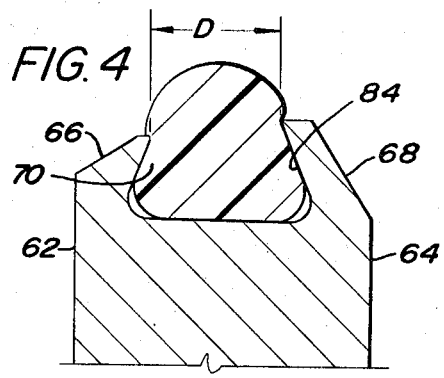
FIG. 4 is an enlarged cross-sectional view of the circled portion of the valve disk shown in FIG. 3.

FIG. 4 is a detailed showing of the periphery of the disk illustrating the manner in which the O-ring or resilient seal 70 is mounted. As can be seen a generally trapezoidally-shaped circumferential groove 84 is formed completely about the periphery of the disk 60. The O-ring is selected so that it is of a normal width substantially greater than the width D of the outer end of the groove 84. Thus, when positioned in the groove, it is engaged throughout an extent of greater than 180° and is substantially compressed along its mid plane. This provides a substantial seal and gripping action between the O-ring and the outer edges of the tapered peripheral walls 66, 68. Further, the O-rings extend a substantial distance beyond the maximum peripheral extent of the disk 60.

Figure 5:
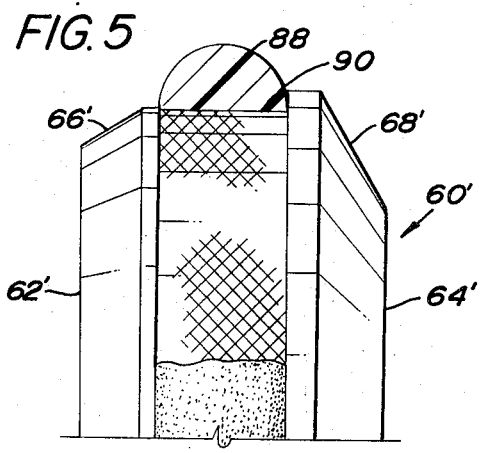
FIG. 5 is a view of a portion of the disk periphery of modified form of valve disk; and, FIG. 6 is an enlarged, somewhat diagrammatic view of the contour of the through passage of the valve of FIG. 1.

FIG. 5 shows a modified form for the peripheral seal edge of the disk. In this modification, like reference numerals have been used to illustrate the corresponding parts but differentiated from the FIGS. 1 through 4 embodiment by the addition of a prime (') suffix. Accordingly, the description of a FIG. 1 through 4 element is to be taken as equally applicable unless otherwise noted. The primary difference between the disk shown in FIG. 5 and that discussed with reference to FIGS. 1 through 4 is that the resilient sealing periphery is formed by a band of resinous material 88 bonded in a shallow groove 90 formed about the periphery of the disk. The resilient material could be of many types but is preferably Viton. As shown, the bottom of the disk is roughened, such as by a light knurling or abrading, so as to increase the bond between the disk and the resinous material. This form of construction for the disk substantially reduces the amount of resinous material present in the valve so that problems with out gassing are reduced. Note in comparison with the FIG. 4 showing that only approximately one third as much resinous material is required to provide an equal amount of outwardly extending seal.

One feature of particular importance to the invention is the arrangement of the passageway 12 and its relationship to the valve disk 60. As preciously mentioned, conventional vacuum systems have standard flange and passageway sizes which limit the design variations permissible with regard to the valves. Further, in order to be satisfactory, the valves should be as narrow in axial width as possible. Referring to FIG. 6, the maximum radius permissible for the inlet end of the flow passage is illustrated by the letter R. This is the maximum available distance between the inner peripheries of the standard metal gaskets used in the conventional vacuum systems. Accordingly, the inlet end of the valve can usefully be no larger than this dimension. An additional factor which limits the maximum diameter of the flow passage is the standard flange bolt spacing illustrated in FIG. 1. Note that sufficient material must be left between the inner peripheries of the bolt hole 16 and the passageway to assure adequate strength. Thus, the maximum diameter of the passageway is closely limited. A second limiting factor is that to provide a more suitable seal, it has been determined that the periphery of the disk should engage a sealing surface inclined at an angle of from 5 to perhaps 10°. Further, in order that the total axial thickness of the valves can be minimized, the actuating stem and valve disk should be located close to the center line of the valve body so that when the disk is rotated to an open position, the periphery of the disk does not extend substantially beyond the ends of the valve. Should it extend any distance beyond, it could interfere with associated equipment and be exposed sufficiently that it might possibly be damaged.

In the past, the contour of the passageway through butterfly valves for vacuum service has typically been substantially as illustrated by the dashed line in FIG. 6. That is, the passageway tapered through the body from the maximum permissible dimension to the opposite end. Since conductivity through the valve is controlled by the minimum passage diameter, the prior art valve had a minimum inner radius $R_1$. Thus, given the limitations described above, the conductivity of the valves was controlled by this radius. In the subject invention, a substantial increase in conductivity is provided by varying the contour of the passageway in a manner which does not affect the valve sealing characteristics or the like. As shown, the passageway 12 includes a first tapered section 94 which extends inwardly from the radius corresponding to the maximum permissible radius at the required angle approximately to a point slightly past the location of the seal periphery of the disk when the valve is in the closed position. From this point on, the passageway is cylindrical. This thus determines the minimum flow passage radius $R_2$ which controls valve conductance. As can be appreciated, by the contour change noted, an increase in valve conductivity is gained because of the increase in radius illustrated by r. This represents a substantial increase in conductance without deviation from the basic design limitations imposed by the surrounding parameters.

What is claimed is:

1. A butterfly valve particularly suited for use in vacuum systems comprising:
   a generally cylindrical metallic body with an axially extending through-flow passage having an inlet and an outlet, said passage having a portion which tapers uniformly from a first diameter D to a second smaller diameter d;
   an operating stem extending radially into said body and diametrically across said passage, said stem being generally cylindrical with a first end being freely and rotatably received in a first bore extending from said passage into said body and a second end received in and extending out of said body through a second bore aligned with and diametrically opposed to said first bore, said second bore being counterbored inwardly from the exterior of said body to provide an annular space about said stem, said space terminating in an annular shoulder adjacent said passageway;
   a pair of spaced flanges carried by said stem at a location within said annular space, the innermost of said flanges resting on and engaging said shoulder and positioning said stem in directions radially of said passageway;
   a stem seal positioned between said flanges and providing a fluid seal between said stem and the walls of said counterbore;
   a stem bearing sleeve member snugly fitted within said second bore radially outwardly of the outermost flange, said sleeve member having an inner end which engages the outermost flange to maintain said stem positioned against radial movement relative to said passageway;
   a valve member comprising a metal disk having a resilient elastomeric seal member carried on its outer circular periphery, the seal member having an outer diameter v which is slightly greater than the second smaller diameter d, said disk having a connecting face parallel to and spaced from the plane of said periphery;
   a flat formed on the portion of said stem which extends across said passageway, said flat being parallel to the axis of said stem;
   connecting means releasably connecting said disk to said stem with the connecting face of said disk in engagement with the flat on said stem, said stem being located at a position such that when said stem is rotated to place its flat perpendicular to the axis of said passageway, said periphery of said valve member compressibly engages said passageway continously about a circumferential line lying in a plane perpendicular to the axis of said passageway within said uniformly tapered portion and closely adjacent the diameter d; and,
   the length of said body being slightly less than the diameter v of said valve member.

2. The valve as defined in claim 1 wherein said tapered portion of said passage has a taper in the range of approximately 5° to 10°.

3. The valve as defined in claim 2 wherein said passage further includes a portion of constant diameter d which connects to the tapered portion at its end of diameter d.

4. The valve as defined in claim 3 wherein the stem is positioned substantially midway between the ends of said passage.

5. The valve as defined in claim 1 wherein said metal disk has a continuous groove in its outer circular periphery, said seal member being releasably held in said groove.

6. The valve as defined in claim 1 wherein said flanges on said stem are held between said shoulder and said sleeve to prevent movement of said stem in directions radially of said passage.

7. The valve as defined in claim 1 wherein the periphery of said disk is provided with stepped diameter portions.

8. A butterfly valve comprising:
   a generally cylindrical body with an axially extending through-flow passage having an inlet and an outlet, said passage having a portion which tapers uniformly from a diameter D to a diameter d;
   an operating stem extending radially into said body and diametrically across said passage, said stem being generally cylindrical with a first end being freely and rotatably received in a first bore extending from said passage into said body and a second end received in and extending out of said body through a second bore aligned with and diametrically opposed to said first bore, said second bore being counterbored inwardly from the exterior of said body to provide an annular space about said stem, said space terminating in an annular shoulder adjacent said passageway;

a pair of spaced flanges carried by said stem at a location within said annular space, the innermost of said flanges resting on said shoulder and positioning said stem in directions radially of said passageway;

a stem seal positioned between said flanges and providing a fluid seal between said stem and the walls of said counterbore;

a stem bearing sleeve member snugly fitted within said radially outer flange, and a radially outer end which extends out of said body;

a valve member comprising a metal disk having a resilient seal member carried on its outer circular periphery, the seal member having an outer diameter $v$ which is slightly greater than $d$, said disk having a connecting face parallel to and spaced from the plane of said periphery;

a flat formed on the portion of said stem which extends across said passageway, said flat being parallel to the axis of said stem;

connecting means releasably connecting said disk to said stem with the connecting face of said disk in engagement with the flat on said stem, said stem being located at a position such that when said stem is rotated to place its flat perpendicular to the axis of said passageway, said periphery of said valve member compressibly engages said passageway continously about a circumferential line closely adjacent the diameter $d$ of said uniformly tapered portion;

the length of said body being slightly less than the diameter $v$ of said valve member; and, wherein the connecting face of said disk has a recess formed therein, said recess being sized to extend beyond the flat of said stem.

9. The valve as defined in claim 8 wherein said disk is releasably connected to said stem by threaded members having a longitudinal groove formed therein which groove intersects the threads and extends the length thereof.

* * * * *